US012368800B2

(12) United States Patent
Benrikhi et al.

(10) Patent No.: US 12,368,800 B2
(45) Date of Patent: Jul. 22, 2025

(54) VOICE COMMUNICATION SERVICE FROM A SOCIAL NETWORK

(71) Applicant: Orange, Issy-les-Moulineaux (FR)

(72) Inventors: Anne Benrikhi, Clamart (FR); Olivier Godiniaux, Paris (FR); Benoit Amet, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 370 days.

(21) Appl. No.: 14/646,659

(22) PCT Filed: Nov. 21, 2013

(86) PCT No.: PCT/FR2013/052817
§ 371 (c)(1),
(2) Date: May 21, 2015

(87) PCT Pub. No.: WO2014/080131
PCT Pub. Date: May 30, 2014

(65) Prior Publication Data
US 2015/0319128 A1 Nov. 5, 2015

(30) Foreign Application Priority Data
Nov. 21, 2012 (FR) ..................................... 1261100

(51) Int. Cl.
*H04W 4/21* (2018.01)
*H04L 9/40* (2022.01)
(Continued)

(52) U.S. Cl.
CPC ...... *H04M 3/42042* (2013.01); *H04L 12/287* (2013.01); *H04L 51/52* (2022.05);
(Continued)

(58) Field of Classification Search
CPC ... H04L 51/32; H04L 12/1822; H04L 63/104; H04L 65/1093; H04L 67/1072; H04L 67/22
See application file for complete search history.

(56) References Cited

U.S. PATENT DOCUMENTS 8,218,744 B2 * 7/2012 Belz ..................... H04M 1/56
379/142.04
2002/0071539 A1 6/2002 Diament et al.
(Continued)

FOREIGN PATENT DOCUMENTS

GB 2450385 A 12/2008
KR 100838012 * 6/2008 ............... H04B 1/40
(Continued)

OTHER PUBLICATIONS

International Search Report dated Apr. 3, 2014 for corresponding International Application No. PCT/FR2013/052817 filed Nov. 21, 2013.
(Continued)

*Primary Examiner* — Lester G Kincaid
*Assistant Examiner* — Dung L Lam
(74) *Attorney, Agent, or Firm* — David D. Brush; Westman, Champlin & Koehler, P.A.

(57) ABSTRACT

For the purpose of managing a voice communication service in a communication network between a first and at least a second communication terminal, the first and second communication terminals have respective communication identifiers in the communication network. The first and second communication identifiers are associated, at least at a server, with first and second social network identifiers of a social network. A communication request is received, indicating at least the first and second social network identifiers; subsequently, the second communication identifier is identified from the second social network identifier received in the
(Continued)

communication request; and, finally, an application notification is transmitted to the second communication terminal on the basis of the second communication identifier. The application notification indicates the first social network identifier.

11 Claims, 4 Drawing Sheets

(51) Int. Cl.

| | | |
|---|---|---|
| H04L 12/28 | (2006.01) | |
| H04L 51/52 | (2022.01) | |
| H04L 67/01 | (2022.01) | |
| H04M 3/42 | (2006.01) | |
| H04M 7/00 | (2006.01) | |
| H04W 4/60 | (2018.01) | |
| H04M 3/56 | (2006.01) | |
| H04W 88/02 | (2009.01) | |
| H04W 88/18 | (2009.01) | |

(52) U.S. Cl.
CPC ............. *H04L 63/10* (2013.01); *H04L 67/01* (2022.05); *H04M 7/003* (2013.01); *H04W 4/21* (2018.02); *H04W 4/60* (2018.02); *H04M 3/56* (2013.01); *H04W 88/02* (2013.01); *H04W 88/18* (2013.01)

(56) References Cited

U.S. PATENT DOCUMENTS

| | | | |
|---|---|---|---|
| 2010/0211638 A1* | 8/2010 | Rougier | G06F 8/30 |
| | | | 717/148 |
| 2011/0069661 A1* | 3/2011 | Waytena, Jr. | H04L 63/102 |
| | | | 370/328 |
| 2011/0182415 A1* | 7/2011 | Jacobstein | H04M 3/563 |
| | | | 379/202.01 |
| 2012/0106728 A1* | 5/2012 | Ghaffari | H04M 7/0033 |
| | | | 379/211.02 |
| 2013/0142088 A1* | 6/2013 | Li | H04W 88/06 |
| | | | 370/271 |
| 2013/0179491 A1* | 7/2013 | Bennett | H04L 65/1076 |
| | | | 709/203 |
| 2013/0218902 A1* | 8/2013 | Vendrow | G06F 17/30867 |
| | | | 707/748 |
| 2015/0356630 A1* | 12/2015 | Hussain | H04L 51/212 |
| | | | 705/14.69 |
| 2018/0137116 A1* | 5/2018 | Victor | G06F 16/93 |

FOREIGN PATENT DOCUMENTS

| | | |
|---|---|---|
| WO | 2008098627 A1 | 8/2008 |
| WO | 2012001016 A1 | 1/2012 |

OTHER PUBLICATIONS

English translation of the Written Opinion dated May 21, 2015 for corresponding International Application No. PCT/FR2013/052817 filed Nov. 21, 2013.

* cited by examiner

VOICE COMMUNICATION SERVICE FROM A SOCIAL NETWORK

CROSS-REFERENCE TO RELATED APPLICATIONS

This Application is a Section 371 National Stage Application of International Application No. PCT/FR2013/052817, filed Nov. 21, 2013, the content of which is incorporated herein by reference in its entirety, and published as WO 2014/080131 on May 30, 2014, not in English.

TECHNICAL FIELD

The present invention pertains at one and the same time to the field of social networks based on the network of Internet type and to the field of voice communication.

PRIOR ART

Social networks reliant on the Internet network allow users thereof to constitute groups of friends or professional acquaintance groups. For this purpose, they provide their users with information exchange tools (or else services), which may be for example photos, states of presence, news information, etc. These exchange services are accessible via suitable user interfaces.

Among the services which may be proposed to users of these social networks, it is possible to provide for telephone setup initiated from the social network involved. Indeed, for one and the same user, his identifier in a social network is associated with his telephone number, and thereby, this user can be reached by telephone from the social network via his social network identifier. In this context, it is possible to provide a server suitable for the provision of this service. Systems are known in which the server ultimately thus places the caller in telephone communication with the called party while handling the numbering of the called party. In this context, the called party receives a telephone call and has no additional information, apart possibly from that represented by the number of the server which may be displayed on the screen of his telephone, as is the case during a conventional telephone call.

SUMMARY

The invention offers a solution not exhibiting the drawbacks of the prior art.

According to one embodiment, the present invention is aimed at a method of management of voice communication service in a communication network between a first and at least one second communication terminal, in which said first and second communication terminals have respective communication identifiers in the communication network, said first and second communication identifiers being respectively associated, at the level of a server, with first and second social network identifiers in a social network, said server being accessible from the communication network, said method comprising the following steps at the level of the server:
/a/ receiving a communication request indicating at least the first and second social network identifiers;
/b/ identifying the second communication identifier on the basis of the second social network identifier received in the communication request;
/c/ sending an application notification destined for the second communication terminal on the basis of the second communication identifier, said application notification indicating the first social network identifier.

The term "voice communication" is intended to mean any type of telephone communication session established between at least two communication terminals which allows at least two respective users of said communication terminals to communicate with one another by voice. A voice communication can thus be implemented for example in a communication network of telephone network type such as a mobile network (such as GSM, UMTS network, etc.).

The term "communication network" is intended to mean any type of network which is suitable for allowing the setup of at least two communication terminals in a telephone communication. The communication possible in this type of network can be of voice type and of data type. Such a communication network is therefore a telephone communication network, which may be a network based on mobile communication protocols, such as for example GSM, UMTS, 3G, 4G. In one embodiment of the present invention, the communication network involved is at one and the same time suitable for managing the establishment of voice communication and of data communication between the various terminals of this network.

The term "communication terminal" is intended to mean any type of communication terminal which makes it possible to establish voice communication sessions via a telephone communication network. It can also make it possible to establish data communications in the communication network to which it belongs, that is to say in which it can initiate the establishment of telephone communication or receive and accept communications which are intended for it. This terminal can for example be a mobile telephone of any type, a tablet, etc.

The term "communication identifier" is intended to mean an identifier associated with a communication terminal in the communication network to which it belongs. Such a communication identifier allows the terminal with which it is associated to be reached and therefore to receive a communication in the communication network involved. Such an identifier can be a telephone number in a mobile telephone network.

The term "social network" is intended to mean any type of social network on the Internet network which can group together communities of people on various criteria, such as for example personal affinities, or else proximity of career path, or else similar centers of interest, etc. The social network based on Facebook, twitter, Viadeo, LinkedIn, etc. may be cited by way of example. Such a social network may be based on a communication network within the meaning of the terms defined hereinabove.

The term "social network identifier" is intended to mean any type of identifier which makes it possible to identify an account of a person on the social network involved. In general, this is a reference created by the user at the time his account is created. This reference can be a string of characters and/or an image, photo, etc. Such a social network identifier can be indicated within the social network in a format different to that visible by the user or by people in his relationship network.

The term "communication request" is intended to mean a request aimed at asking for communication setup between at least two communication terminals of the communication network to which these communication terminals belong. Such a request can correspond, in an embodiment of the present invention, to a message received in the communication network from any terminal (which may be different from the communication terminal on which the voice communication will take place) whose user wishes to be placed in voice communication with another person using another terminal. No limitation is attached to the type of this message. It is important to note here that this communication request may be sent from a terminal which is distinct from the first terminal. Such may be the case, in particular, when a user is connected to a communication network via a terminal that does not have any voice communication management capability. In this case, the terminal of the person desiring the voice communication, from which the communication request is sent, is distinct from the communication terminal whose communication identifier is associated with the social network identifier indicated in the communication request. Thus, a person can initiate the communication request from a PC, whereas it is his mobile telephone terminal which has his telephone number associated with his social network identifier.

The term "application notification" is intended to mean any type of notification that can be transmitted on the communication network and that can be processed at the application level of a communication terminal of the communication network. This application level of a communication terminal according to an embodiment of the present invention is subsequently referred to by the term "service application". This service application represents the application level suitable for the implementation of a method of management of communication service at the level of the terminal.

It should be noted that there is provided an association of the communication identifiers of the terminals with respective social network identifiers, in an embodiment of the present invention. This association is known from the server. It can be stored in a database without any limitation attached to this aspect, the server having access to this information regarding association between communication identifiers in the communication network and social network identifiers of the social network. By virtue of this association, a voice communication setup can be implemented by the server on merely the social network identifier information. No limitation is attached to the enrollment phase which allows this association. It is in particular possible to provide a phase of prior registration with the communication management service in which each subscriber declares their wish to associate a communication terminal with a social network identifier. For this purpose, he can provide at one and the same time a social network identifier and the communication identifier of the terminal on which he wishes to be able to be reached via the social network concerned. Provision may readily be made for a user to declare several communication terminals associated respectively with several social networks, given that one and the same user may have several accounts in various social networks. No limitation to this type of situation is attached to the present invention.

In one embodiment of the present invention, a server accessible from a communication network is advantageously suitable for sending an application notification destined for a second communication terminal identified by its communication identifier in the communication network, for example its telephone number, this notification indicating the social network identifier of the first terminal. This application notification is, in an embodiment, generated on the basis of a communication request received beforehand, indicating the first and second social network identifiers which are respectively associated with the first and second communication identifiers.

By virtue of these characteristics, it is advantageously possible to invite a user of the second communication terminal to be in voice communication with a user of the first communication terminal while informing him of the social network identifier of the one that wishes to reach him. Such a notification makes it possible to offer a service of communication setup between at least two people via their respective communication terminals on the basis of a client path that is at one and the same time clear, simple and secure. Indeed, by virtue of this notification indicating the social network identifier associated with the first communication terminal, the user of the second communication terminal is able to decide to accept the communication on the basis of a clear and important item of information that allows him to recognize the other person by his identity in the social network involved. This item of information makes it possible to filter such a communication request in a simple, fast and effective manner.

Generally, a user of a communication network may be in extreme demand from his communication terminal on a daily basis. Therefore, during a call, he does not wish to have to disclose his telephone number so as to protect himself from the proliferation of demands for voice communication and to control the dissemination of his telephone number. But for all that, when this communication network user is in demand from a voice communication, he wishes to have information on the context of the communication before accepting the latter. Indeed, if a demand for a communication originates from a masked number for example, the called party will tend to be reticent to take the call.

The present invention very advantageously makes it possible to address these two problematic issues: on the one hand the need to control and to reduce the dissemination of one's telephone number and on the other hand to have information during a demand for voice communication. Indeed, by virtue of the present invention, on the one hand, there is no need to disclose his communication identifier when a person is invited to a voice communication. Only the social network identifier is disclosed, the server alone using the association between social network identifier and communication identifier. Thus, the confidentiality of the communication identifier can be preserved. Also, on the other hand, by virtue of the present invention likewise, a communication terminal in demand for a voice communication can nevertheless have information that is useful in order to ascertain the context of the communication, in particular it has at least a social network identifier. It can also ascertain the reason for the communication via the subject which can be transmitted in the request. By virtue of the application notification, it is possible to summon a person for a voice communication while providing him with contextual information useful in deciding whether or not to accept the invitation, without however having to transmit to him the initiator's communication identifier, such as the telephone number for example.

By virtue of these characteristics, it is possible to aid a user to filter his voice communications without however requiring that the telephone numbers of the "callers" be disclosed.

Provision may readily be made for the application notification to also indicate an image associated with the social network identifier, this image possibly being a photo of the corresponding person. Thus, the user can be prompted as to whether to accept or decline the communication setup on the basis of a photo for example of the person who desires this voice communication setup.

In one embodiment of the present invention, the method of management of communication service furthermore comprises the following steps, after step /a/:

/i/ identifying the first communication identifier on the basis of the first social network identifier received in the communication request;

/ii/ sending an application notification destined for the first communication terminal on the basis of the first communication identifier.

Here, the server being able to identify the communication identifier of the first terminal on the basis of the first social network identifier, it is also capable of sending an application notification destined for the first terminal. This application notification can thus trigger a service application residing on the first terminal so as to offer an interface on the terminal appertaining to the offer of voice communication service involved.

Provision may in particular be made for the communication request received in step /a/ to originate from a terminal distinct from the first communication terminal. In this case, it may be advantageous to awaken the service application on the first terminal so as to cause for example the display of an interface suitable for the offer of the communication service.

In one embodiment, the application notification furthermore indicates at least one third social network identifier. Such may be the case when the communication request indicates the third social network identifier. This case may correspond to the fact that initially several social network identifiers have been convened in the voice communication in one and the same communication request. It is also possible for the server to receive several distinct communication requests, one indicating the second social network identifier and at least one other the third social network identifier at distinct respective times. In this case, the server can send a notification indicating all the social network identifiers of the people who are invited to a voice communication in association with the first network identifier, that is to say in this case, the second and third social network identifiers, or else send a plurality of communication requests.

The application notification can also furthermore indicate a communication state associated with said at least third social network identifier. Thus, advantageously, the server can inform the user of the second terminal of the communication state of the other party invited to the voice communication, that is to say of the person to whom the third social network identifier corresponds. The term "communication state" is intended to mean the fact that the voice communication is already established with the communication terminal of this other invitee or otherwise.

The application notification can furthermore indicate an associated subject. Here this entails informing the user of the second communication terminal of the subject that the one that generated the communication request wishes to raise with him during the requested voice communication.

This information, just like the information regarding the communication state of the other parties invited to the communication can be an aid to decision taking relating to the acceptance of the voice communication. This contextual information makes it possible to advantageously enrich the communication service aimed at by affording specific and detailed illumination about the context of communication in progress.

The communication setup between the communication terminals can be carried out in various ways and no limitation is attached to this aspect of the present invention.

The application notification can in particular indicate an identifier of communication setup allowing the establishment of a voice communication. In this case, in case of acceptance of the voice communication, the second communication terminal can itself trigger the communication setup to this identifier.

The identifier of communication setup can correspond to a telephone number. Here, the second communication terminal can dial the telephone number.

The telephone number can correspond to a telephone conference number. This case is advantageous when several terminals are "invited" to join the voice communication by the initiator of the communication request.

Provision may then be made for each communication terminal (first, second, third, etc.) to have an application suitable for receiving the application notification and dialing the telephone number of the conference aimed at upon acceptance of the user to join the voice communication.

The identifier of communication setup can correspond to the communication identifier associated with the first communication terminal. Such may be the case when the communication service provides for a direct communication setup between the first and second communication terminals.

In one embodiment of the present invention, the method of management of communication service furthermore comprises the following steps:

/d/ reception of an acceptance of communication from the second communication terminal;

/e/ setup of communication of the second communication terminal with the first communication terminal, via said server.

These steps /d/ and /e/ can therefore occur in certain embodiments, when a user of the second communication terminal who has received the application notification according to an embodiment of the present invention accepts the voice communication with the person identified via his social network identifier.

It should be noted that these steps can be carried out on any server of the communication network.

Thus, on receipt of the acceptance of voice communication, the server is in charge of the voice communication setup between the first and second communication terminals. Indeed, on a side (step /a/) there has been received a communication request indicating the social network identifiers associated with the communication terminals to be placed in voice communication, and on another side there has been received the acceptance of a communication terminal (step /d/).

No limitation is attached to the setup of voice communication between the first and second communication terminals. Thus, the communication acceptance received from the second communication terminal at the level of the server may be of any type.

The present invention is aimed, in one embodiment, at a method of management of voice communication service in a communication network between a first and at least one second communication terminal, in which said first and second communication terminals have respective communication identifiers in the communication network, said method comprising the following steps at the level of the second communication terminal:

/1/ receiving an application notification indicating a first social network identifier;

/2/ displaying on a screen of the second communication terminal at least said first social network identifier and a selectable option suitable for triggering a voice communication from the second communication terminal with the first communication terminal.

Advantageously here, a communication terminal is able to display for its user a social network identifier with an option suitable for triggering a voice communication from this terminal. By virtue of the reception of an application notification according to an embodiment of the present invention, it is possible to provide an aid to the decision to accept a voice communication, without however having to disclose the telephone number of the caller. Accordingly, the communication terminal can have a service application which is suitable for being activated on receipt of the application notification and which proposes, via a tactile interface for example, a voice communication relating to the social network identifier displayed. Such a service application may be in a native manner on the terminal or else be downloaded from an Internet site for example. It may also contain an identifier of communication setup which allows it to initiate the voice communication for the communication terminal in the case where the selectable option is selected. It may also receive this identifier via the application notification or a subsequent application notification.

The application notification can furthermore indicate at least one third social network identifier and said third social network identifier can furthermore be displayed.

The application notification can furthermore indicate a communication state associated with said at least third social network identifier, said communication state being furthermore displayed.

The application notification can furthermore indicate an associated subject.

When the application notification furthermore indicates an identifier of communication setup allowing the establishment of a voice communication, and when the selectable option is selected, the second communication terminal can then trigger the communication setup on the basis of said identifier of communication setup. Of course, the identifier of communication setup can be retrieved at the level of the communication terminal by other means, in particular by prior downloading for example.

The telephone number can correspond to a telephone number and, when the selectable option is selected, the second communication terminal can then trigger the communication setup by dialing said telephone number. This triggering can be carried out in a manner which is automatic and transparent to the user of the terminal, via a suitable service application.

On receipt of the application notification, the second communication terminal can activate a service application, step /2/ being carried out via said service application.

The telephone number can be dialed automatically by the service application.

A sound alarm can also be generated, at the level of the communication terminal, on receipt of the application notification.

In step /1/, provision may be made for the application notification to indicate a private or public character of the voice communication.

The present invention is also aimed, in one embodiment, at a server for management of communication service in a communication network between a first and at least one second communication terminal, in which said first and second communication terminals have respective communication identifiers in the communication network, said first and second communication identifiers being respectively associated with first and second social network identifiers in a social network at the level of the server, said server, accessible from the communication network, comprising:

/a/ a reception unit suitable for receiving a communication request indicating at least the first and second social network identifiers;

/b/ an identification unit suitable for identifying the second communication identifier on the basis of the second social network identifier received in the communication request;

/c/ a sending unit suitable for sending an application notification destined for the second communication terminal on the basis of the second communication identifier, said application notification indicating the first social network identifier.

This server may be suitable for the implementation of a method of management of communication service such as stated hereinabove at the level of the server.

The present invention is also aimed at a communication terminal having a communication identifier in a communication network, said communication terminal comprising:

a/ a reception unit suitable for receiving an application notification indicating a social network identifier;

b/ a display unit suitable for displaying on the screen of the communication terminal at least said social network identifier and a selectable option suitable for triggering a voice communication.

This communication terminal may be suitable for implementing a method of management of communication service such as described hereinabove implemented at the level of the communication terminal.

The present invention is also aimed at a system for management of communication service in a communication network, comprising a server according to an embodiment and at least one communication terminal according to an embodiment of the present invention.

The present invention is aimed furthermore at a computer program able to be implemented on a communication terminal, the program comprising code instructions which, when the program is executed by a processor, carries out the steps of the method implemented at the level of the terminal.

This computer program may correspond to a service application according to an embodiment of the present invention. It may be downloadable from a site for example. It therefore makes it possible to manage the reception of the application notification, as well as to offer a user interface making it possible to display at least the social network identifier of the caller, as well as the selectable option so as to trigger, that is to say accept, the proposed voice communication.

BRIEF DESCRIPTION OF THE DRAWINGS

The invention will be better understood on reading the description which follows, given by way of example and with reference to the appended drawings.

The figures:

FIGS. 3-*a*, 3-*b* and 3-*c* illustrate an interface of a service application according to an embodiment of the present invention.

DETAILED DESCRIPTION OF ILLUSTRATIVE EMBODIMENTS

Figure 1:
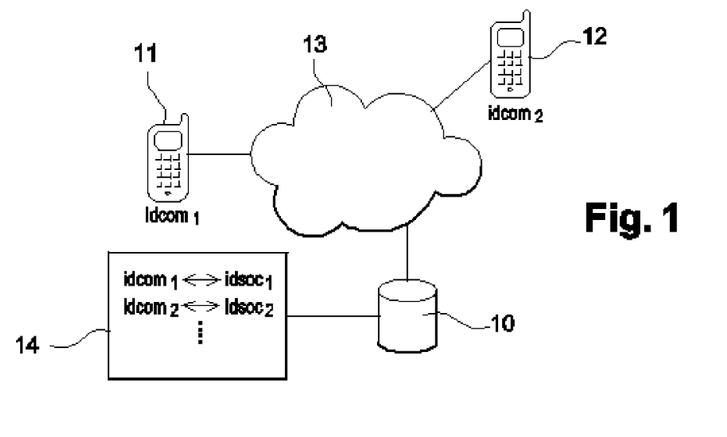
FIG. 1 represents a communication network according to an embodiment of the present invention.

FIG. 1 represents a communication network 13 according to an embodiment of the present invention. A communication terminal 11 and a communication terminal 12, hereinafter referenced terminal 11 and terminal 12, are terminals of the communication network 13 in the sense that they have communication identifiers that are recognized in this network, respectively idcom1 and idcom 2. A server 10 is also accessible in this communication network, the latter having access to association information 14. This information can be stored in a database and it represents an association of the communication identifiers that are recognized in this network with social network identifiers, respectively idsoc1 and isoc2 for the communication identifiers icom1 and idcom2. This information can be supplied beforehand by any mechanism which makes it possible to construct this association.

The network 13 can be a mobile communication network which offers at one and the same time the possibility of data communications and of voice communication. In this case, the terminals 11 and 12 are mobile telephone terminals. By way of example, the present invention will be described in this type of context. But this in no way limits the fields of application of the invention, since the intent is solely and simply to illustrate the mechanisms of the present invention, without limiting them.

Figure 2:
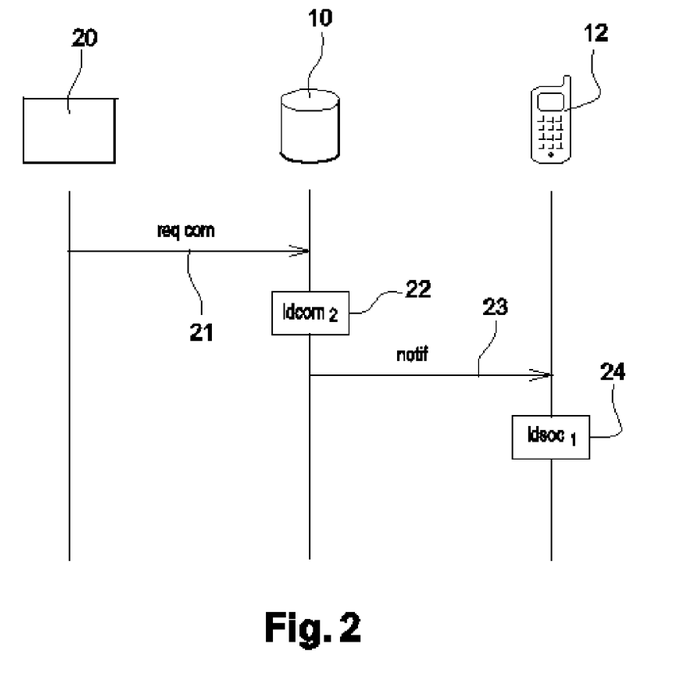
FIG. 2 illustrates an implementation of a method of management of communication service according to an embodiment of the present invention.

FIG. 2 illustrates an implementation of a method of management of communication service according to an embodiment of the present invention. It should be noted that a terminal 20 sends a communication request 21 in the sense of the present invention. This terminal can be any type of terminal which is able to transmit a message to the server 10 via the communication network 13. It can correspond to the terminal 11, or else be another terminal.

Given that the communication request 21 indicates at least the first and second social network identifiers which are associated with idcom1 and idcom2, reference 14, it may be advantageous for provision to be made to generate this request from the terminal 20, and more particularly from the social network involved, the most propitious environment to allow easy indication of the social network identifiers involved. More precisely, provision may be made for a service application in the sense of the present invention "connected" or linked or integrated into the social network. Thus, such an application would allow the user, dubbed hereinafter the "caller", to generate this request from an appropriate interface of the service application.

Figure 3A:
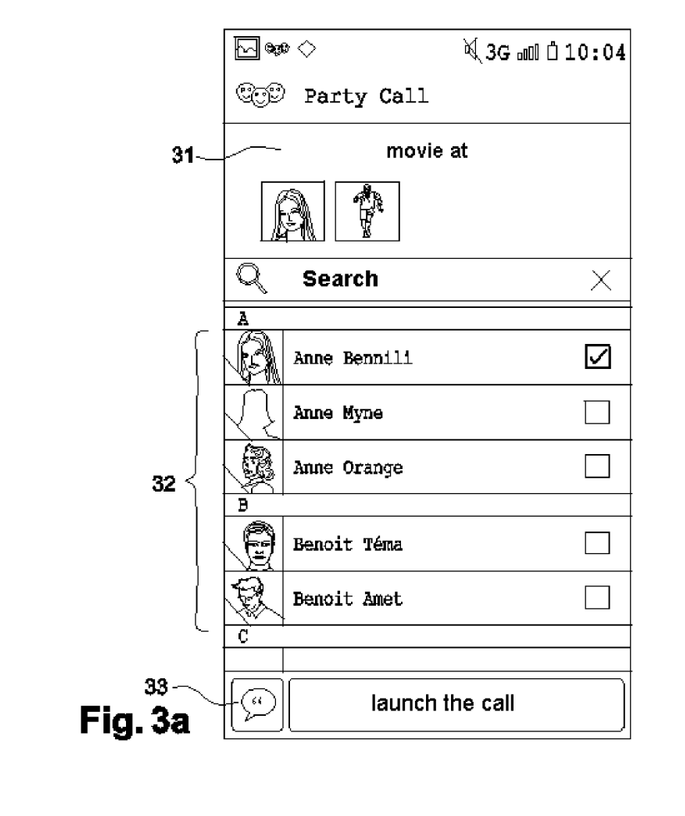
Figure 3B:
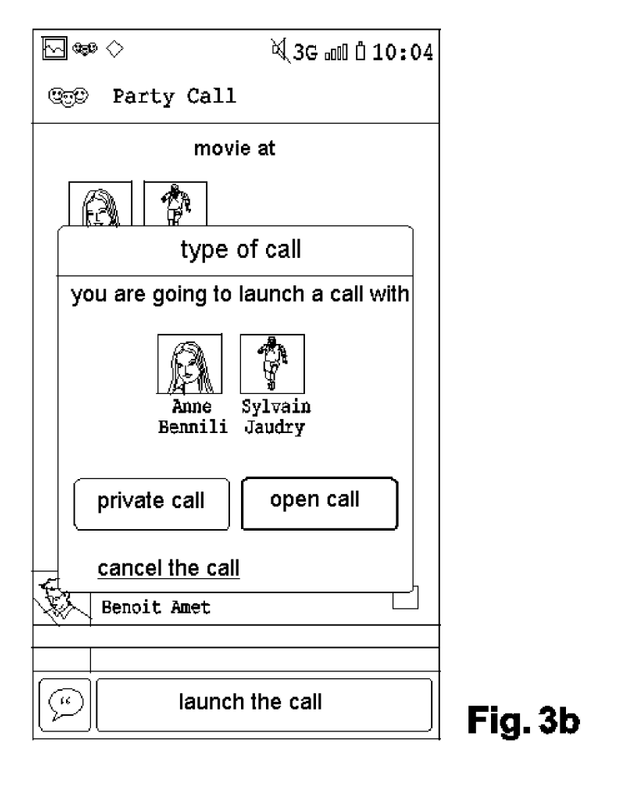

FIG. 3-a, 3-b illustrates such an interface of such an application.

On receipt of the request 21, the server 10 retrieves the idcom2 associated with the idsoc2 indicated in the request 21, in a step 22. Next, it sends an application notification 23 destined for the terminal 12 on the communication network. On receipt of this application notification 23, a display is triggered in a step 24, providing a user of the terminal 12 with the social network identifier of the one indicated in the request 21.

In FIG. 3-a it is thus possible to provide various windows:
a window 31 in which a subject is associated with the voice communication during launch. Here, the subject is "movie".

This window can also indicate the various parties invited to participate in the voice communication. Here, in the example these invitees are identified by their image in the social network, which can be a social network identifier in the sense of the present invention;
a window 32 in which are listed the social network identifiers which can be selected to launch the voice communication;
a window 33 which allows the caller user to launch the invitations to invite the people selected on their basis of their social network identifier to join in a voice communication.

By virtue of this interface, it is easy for the caller user to launch a telephone conference for example, by rapidly selecting the social network identifiers, by indicating a subject to the call, before clicking on the icon.

FIG. 3-b illustrates an interface making it possible to select whether the call to be launched is open (that is to say public) or private. If the call is public, other people of the social network are able to ascertain the existence of this voice communication and optionally to be able to join it. If the call is private, only the parties invited to the voice communication during launch can have acquaintance therewith.

Figure 4:
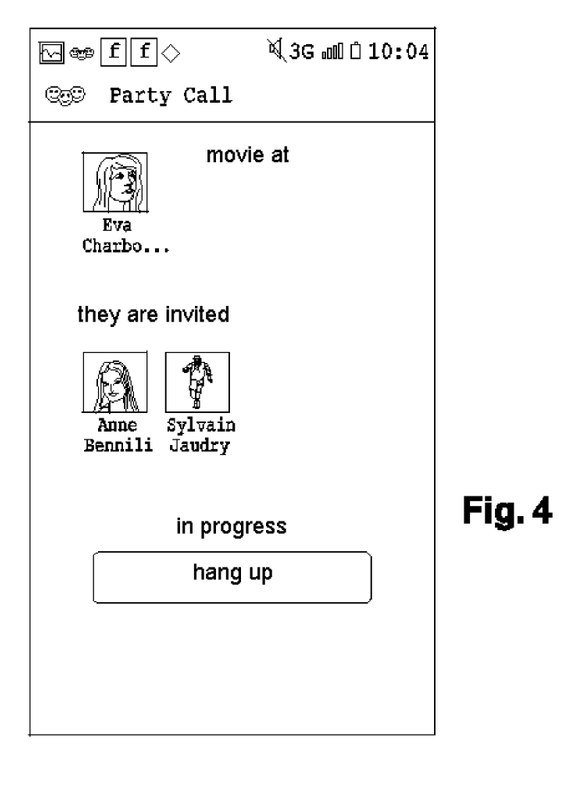
FIG. 4 illustrates a calling side interface according to an embodiment of the present invention.

FIG. 4 illustrates a calling side interface, on the terminal 20 for example, when the caller has launched the call.

On receipt of the communication request 21 which therefore indicates the social network identifier selected by the caller, the server consults the associated data 14 so as to retrieve the associated communication identifier. Here this is the identifier idcom2. In the present example, idcom2 corresponds to the telephone number of the terminal 12.

The server 10 then sends an application notification 23 destined for the terminal 12, this notification indicating at least the social network identifier of the caller idsoc1.

In this step, on receipt of this notification 23, provision may advantageously be made for the terminal 12 to send a sound alert, preferably distinct from that sent by the arrival of a conventional incoming call. Provision may also be made for an automatic display without any intervention from the user of the terminal 12 to be triggered so as to release the terminal 12 from a possible standby mode and so as to rapidly allow the user to have access to the useful information in order to take the decision to continue and therefore to accept the voice communication, or else to delay this decision.

Figure 3C:
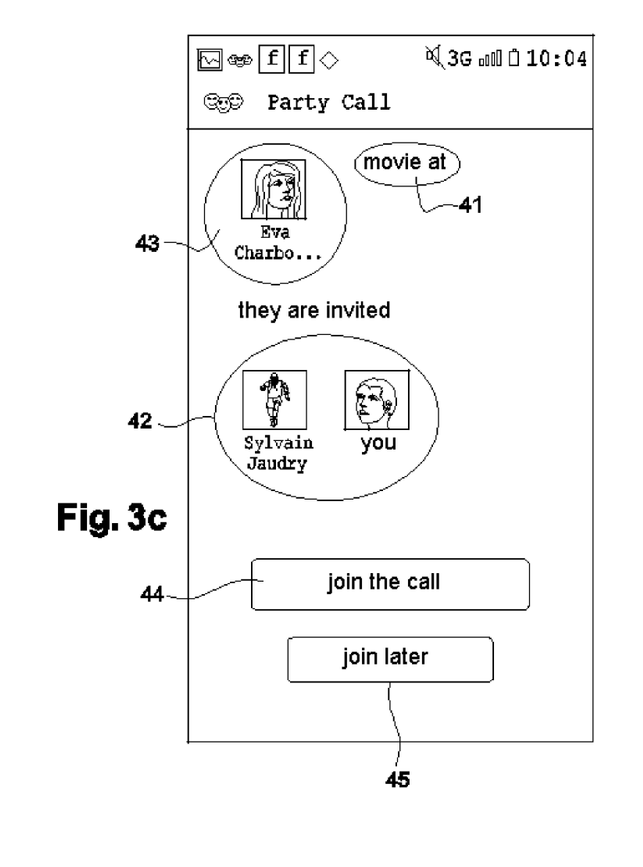

FIG. 3-c illustrates an interface of a service application according to an embodiment of the present invention.

In the example taken, there are two parties 42 invited to the voice communication, the subject of the communication is also displayed 41 "movie" and the caller is displayed 43. The caller and the invitees are identified through this simple interface by their social network identifier.

A selectable option 44 is suitable for triggering a voice communication from the terminal 12 with the terminal 11.

Figure 5:
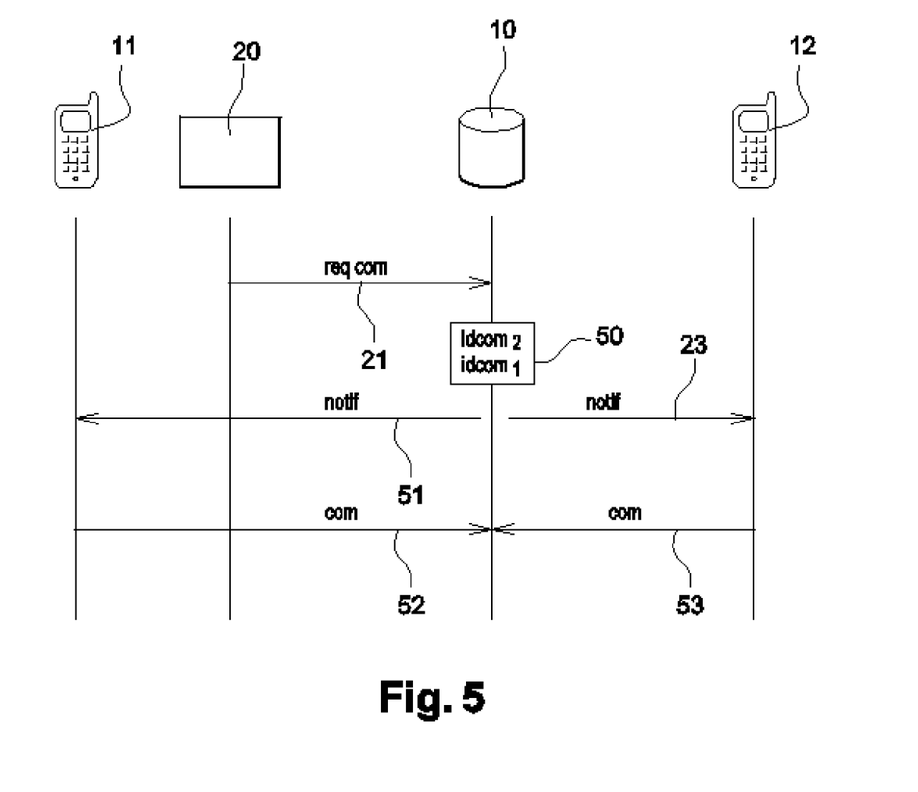
FIG. 5 illustrates a method of management of communication service according to an embodiment of the present invention.

FIG. 5 illustrates a method of management of communication service according to an embodiment of the present invention. Here, for example the terminal 20 is distinct from the terminal 11. But this mechanism also applies when the communication request arises directly from the terminal 11. On receipt of this communication request, the server retrieves 50 the communication identifiers idcom1 and idcom 2, that is to say in this example the mobile telephone numbers of the terminals 11 and 12, on the basis of the social network identifiers of the request 21. Thus, it is able to dispatch an application notification 51 to the terminal 11 also. This notification 51 can contain an identifier of communication setup which makes it possible to place the terminal 11 in voice communication. Provision may be made for setup of communication of the terminal 11 to be automatic since said setup corresponds to the calling party, in contradistinction to the invitee 12 who may decide not to follow up the invitation.

In the case of a plurality of invitees, provision may be made to send one or more communication requests. Next, the server then generates a communication notification bound for each of the invitees and optionally also bound for the calling party 11.

Each of the terminals 11, 12 has a service application which is suitable for receiving the application notification and for providing a user interface for access and management of the service at the level of the terminals.

The establishment of the voice communication between the caller, that is to say he who initiates the sending of the communication request, and the invitees, that is to say those who have been selected and who appear in the communication request in the form of social network identifiers, can be done in various ways and does not limit the extent of the present invention in any regard.

By way of example, provision may be made for either the service application, or the application notification to indicate a telephone number. Thus, on receipt of such a notification, the terminal 11 or 12 is able to trigger the call bound for this telephone number. This step is illustrated by the generation of a "com" message 52 from the terminal 11 and 53 from the terminal 13 which correspond to a telephone call to a known number from the terminals 11 and 12. This telephone number may advantageously be a telephone conference number. In this case, the voice communication can greet several invitees identified under their social network identifiers. The voice communication can then be managed as a conference, so that waiting messages can in particular be played while waiting for example for the caller if the latter joins the conference after some of the invitees thereof.

Although the present disclosure has been described with reference to one or more examples, workers skilled in the art will recognize that changes may be made in form and detail without departing from the scope of the disclosure and/or the appended claims.

The invention claimed is:

1. A method of managing a telephonic communication service in a communication network between a first communication terminal and at least one second communication terminal, in which said first and second communication terminals have respective first and second communication identifiers in the communication network, said first and second communication identifiers being respectively associated at a level of a server with first and second social network identifiers of a social network, said server being accessible from the communication network, said method comprising the following acts:
   selecting by a terminal device a social network identifier of a caller and a second network identifier of a callee of a voice communication;
   selecting a type of call including whether the call invitation is to be launched private or public;
   allowing other people of the social network to discover the existence of this voice communication and optionally join the call if the type of call is public;
   allowing only invited parties to join the call if the type of call is private;
   sending, by the terminal device to a server, an invitation comprising the first social network identifier of a caller and the second network identifier of a callee;
   at the server, receiving the invitation from the terminal device;
   at the server, retrieving the second communication identifier associated with the second social network identifier on the basis of the second social network identifier received in the communication request;
   at the server, triggered by the retrieval of the second communication identifier, transmitting an application notification over the communication network destined for the second communication terminal on the basis of the retrieved second communication identifier, said application notification indicating the first social network identifier, said application notification further comprising a phone number specifically associated to the first communication terminal; and
   at the second communication terminal, after the application notification has been transmitted by the server, triggering, upon acceptance of an invitation comprising an indication of the first social network identifier, making a phone call to the first communication terminal by dialing the phone number.

2. The method according to claim 1, furthermore comprising the following acts, after the act of receiving a communication request:
   identifying the first communication identifier on the basis of the first social network identifier received in the communication request; and
   sending an application notification destined for the first communication terminal on the basis of the first communication identifier.

3. The method according to claim 1, in which, the application notification destined for the second terminal furthermore indicates at least one third social network identifier.

4. The method according to claim 3, in which the application notification destined for the second terminal furthermore indicates a communication state associated with said at least third social network identifier.

5. The method according to claim 1, in which the application notification destined for the second terminal furthermore indicates an identifier of communication setup allowing the establishment of a voice communication.

6. The method according to claim 1, further comprising:
   receiving an acceptance of communication from the second communication terminal; and
   setting up the second communication terminal to communicate with the first communication terminal, via said server.

7. A communication system comprising:
   a first communication terminal;
   at least one second communication terminal;
   a terminal device comprising a processor; and
   a server comprising:
      a processor; and
      a non-transitory computer-readable medium comprising instructions stored thereon, which when executed by the processor configure the server to perform acts comprising managing a telephonic communication service in a communication network between the first and the at least one second communication terminal, in which said first and second communication terminals have respective first and second communication identifiers in the communication network, said first and second communication identifiers being respectively associated at a level of the server, with first and second social network identifiers in a social network, said server being accessible from the communication network, wherein the managing comprises:

in response to the processor of the terminal device selecting a social network identifier of a caller and a second network identifier of a callee of a voice communication and selecting a type of call including whether the call is to be launched private or public:

allowing other people of the social network to discover the existence of this voice communication and optionally join the call if the type of call is public;

allowing only invited parties to join the call if the type of call is private;

receiving an invitation from the terminal device comprising the first and second social network identifiers over the communication network;

receiving a message corresponding to a phone call from the second communication terminal to the first communication terminal, the phone call being made by dialing a phone number specifically associated to the first communication terminal;

retrieving the second communication identifier associated with the second social network identifier on the basis of the second social network identifier received in the invitation; and triggered by the retrieval of the second communication identifier, transmitting an application notification over the communication network destined for the second communication terminal on the basis of the retrieved second communication identifier, said application notification indicating the first social network identifier, said application notification further comprising the phone number said at least one second communication terminal comprising:

a reception unit configured to receive the application notification;

a display unit configured to display the application notification comprising a selectable option to accept an invitation comprising an indication of the first social network identifier; and a processor configured to trigger a phone call to the first communication terminal by dialing the phone number upon the selecting of the option to accept.

8. The method according to claim 1, wherein the method comprises at the second communication terminal, concealing the phone number from a user of the second communication terminal before and during the act of making the phone call to the first communication terminal.

9. The method according to claim 1, wherein the first communication terminal remains a called terminal throughout the method, and the transmission of the application notification to the second terminal is not preceded by a call to the second communication terminal.

10. The communication system according to claim 7, wherein the first communication terminal remains a called terminal throughout the acts performed by the server, and the transmission of the application notification to the second terminal is not preceded by a call to the second communication terminal.

11. The method according to claim 1, wherein the first communication terminal remains a called terminal throughout the acts performed by the server, and the transmission of the application notification to the second terminal is not preceded by a call to the second communication terminal.

* * * * *